(12) United States Patent
Du (10) Patent No.: US 12,111,007 B2
(45) Date of Patent: Oct. 8, 2024

(54) INTELLIGENT DATA ACQUISITION SYSTEM AND METHOD FOR PIPELINES

(71) Applicant: Shuyong Paul Du, Plano, TX (US)

(72) Inventor: Shuyong Paul Du, Plano, TX (US)

(*) Notice: Subject to any disclaimer, the term of this patent is extended or adjusted under 35 U.S.C. 154(b) by 1044 days.

(21) Appl. No.: 17/037,404

(22) Filed: Sep. 29, 2020

(65) Prior Publication Data

US 2021/0062954 A1 Mar. 4, 2021

Related U.S. Application Data

(63) Continuation of application No. PCT/US2019/025438, filed on Apr. 2, 2019.

(60) Provisional application No. 62/651,520, filed on Apr. 2, 2018.

(51) Int. Cl.
| | |
|---|---|
| *F16L 55/48* | (2006.01) |
| *F16L 101/30* | (2006.01) |
| *F17D 5/06* | (2006.01) |
| *G01M 3/00* | (2006.01) |
| *G01N 23/04* | (2018.01) |
| *G01N 29/12* | (2006.01) |
| *H04L 67/12* | (2022.01) |
| *H04W 4/38* | (2018.01) |

(52) U.S. Cl.
CPC .............. *F16L 55/48* (2013.01); *F17D 5/06* (2013.01); *G01M 3/005* (2013.01); *G01N 23/04* (2013.01); *G01N 29/12* (2013.01); *H04L 67/12* (2013.01); *H04W 4/38* (2018.02); *F16L 2101/30* (2013.01); *G01N 2223/628* (2013.01)

(58) Field of Classification Search
CPC ..................................................... F16L 55/48
See application file for complete search history.

(56) References Cited

U.S. PATENT DOCUMENTS

| | | | |
|---|---|---|---|
| 4,945,775 A | 8/1990 | Adams et al. | |
| 6,023,986 A | 2/2000 | Smith et al. | |
| 6,970,808 B2 | 11/2005 | Abhulimen et al. | |
| 8,479,566 B2 | 7/2013 | Haseloh et al. | |
| 10,378,689 B2 * | 8/2019 | Giron ................. | F16L 55/48 |

(Continued)

FOREIGN PATENT DOCUMENTS

| | | | | |
|---|---|---|---|---|
| AU | 2012267129 A1 * | 1/2014 | ......... | B23K 37/0276 |
| CA | 3043138 A1 * | 6/2018 | ............. | F16L 55/48 |

(Continued)

OTHER PUBLICATIONS

CA-3043138-A1, English (Year: 2018).*

(Continued)

*Primary Examiner* — Ryan D Walsh
(74) *Attorney, Agent, or Firm* — Jessica W. Smith; LOZA & LOZA, LLP (57) ABSTRACT

An inline robotic detector for inspection of pipelines includes two groups of real time sensors at both front and rear to measure pressures, temperatures, and flows. The robotic detector further includes radial displacement sensors, acoustic sensors and a digital radiographic camera or Electromagnetic Acoustic Transducer (EMAT) at the head and front, and a rechargeable power system at the rear. A GPS positioning module and communicator communicate with an intelligent gateway. Real time data is obtained and associated with the geo-position of the robotic detector received from the intelligent gateway.

16 Claims, 9 Drawing Sheets

(56) References Cited

U.S. PATENT DOCUMENTS

| | | |
|---|---|---|
| 11,131,419 B2* | 9/2021 | Du .................... F16L 55/26 |
| 2004/0146140 A1 | 7/2004 | McCain |
| 2004/0217759 A1 | 11/2004 | Burkhardt et al. |
| 2006/0129338 A1 | 6/2006 | Turley et al. |
| 2009/0013806 A1 | 1/2009 | Miller et al. |
| 2009/0150094 A1 | 6/2009 | Van Velsor et al. |
| 2014/0176344 A1 | 6/2014 | Littlestar et al. |
| 2018/0237039 A1* | 8/2018 | Mong .................. B61L 23/005 |
| 2019/0123835 A1* | 4/2019 | Poe ...................... F16L 41/008 |
| 2020/0208769 A1* | 7/2020 | Du .................... F16L 55/28 |

FOREIGN PATENT DOCUMENTS

| | | | |
|---|---|---|---|
| CN | 104832791 A | 8/2015 | |
| CN | 103926036 B | 11/2017 | |
| CN | 103926037 B | 12/2017 | |
| CN | 110023791 A * | 7/2019 | ............ F16L 55/48 |
| WO | WO-2010120189 A2 * | 10/2010 | ............ F16L 55/26 |
| WO | 2012167380 A1 | 12/2012 | |
| WO | WO-2015101676 A1 * | 7/2015 | ........... B08B 9/0551 |

OTHER PUBLICATIONS

Parfomak, "Pipelines: Securing the Veins of the American Economy", Congressional Research Service, 7-5700, dated Apr. 19, 2016, 14 pages.

Subramanian, Improving Security of Oil Pipeline SCADA Systems Using Service-Oriented Architectures, on the Move to Meaningful Internet Systems, 344-353 (2008), located at http://www.uttyler.edu/cs/documents/subramanian.pdf.

National Transportation Safety Board, Supervisory Control and Data Acquisition (SCADA) In Liquid Pipelines, Safety Study NTSB/SS-05/02, dated Nov. 29, 2005, 108 pages.

Yorick-Oden-Plants, Inspection and Maintenance of Crude Oil Transmission Pipelines in the Great Lakes-St. Lawrence River Region, Sep. 2017, Great Lakes Commission, 18 pages.

Murray et al., A Mathematical Introduction to Robotic Manipulation, Lyapunov Stability Theory, Copyright 1994, CRC Press, pp. 179-188.

Chase et al., A Review of Active Mechanical Driving Principles of Spherical Robots, Published Nov. 22, 2012, vol. 1, pp. 3-23.

Pfeifer et al., New Robotics: Design Principles for Intelligent Systems, Paper prepared for the Special Issue of Artificial Life on New Robotics, Evolution and Embodied Cognition, dated Apr. 6, 2003, 15 pages.

Stoytchev, Some Basic Principles of Developmental Robotics, IEEE Transactions on Autonomous Mental Development, vol. 1, No. 2, Aug. 2009, 9 pages.

Sub 9kHz Amateur Radio, VLF Using Earth Mode, downloaded Jan. 12, 2021, 7 pages, located at https://sites.google.com/site/sub9khz/earthmode.

Taylor, Earth Current Communications, dated Oct. 1998, 21 pages, located at http://www.wireless.freeserve.co.uk.

Meulstee, Earth Current Signalling. The History of the Power Buzzer. Journal of the Royal Signals, Spring 1988, 53 pages.

Recommendation ITU-R V.431-7, Nomenclature of the Frequency and Wavelength Bands Used in Telecommunications, Archived from the original (PDF) on Oct. 13, 2013. Retrieved Feb. 20, 2013, 3 pages.

International Search Report and Written Opinion for International Application No. PCT/US2019/025438, dated Jun. 28, 2019, 7 pages.

* cited by examiner

INTELLIGENT DATA ACQUISITION SYSTEM AND METHOD FOR PIPELINES

RELATED APPLICATIONS

The present application claims priority under 35 U.S.C. § 120 as a nonprovisional continuation application to PCT Application No. PCT/US2019/025438 entitled "AN INTELLIGENT DATA ACQUISITION SYSTEM AND METHOD FOR PIPELINES" and filed Apr. 2, 2019, which is hereby expressly incorporated by reference herein, which claims priority under 35 U.S.C. § 119(e) to U.S. Provisional Application No. 62/651,520 entitled "AN INTELLIGENT DATA ACQUISITION SYSTEM AND METHOD FOR PIPELINES" filed Apr. 2, 2018, which is also hereby expressly incorporated by reference herein.

FIELD

This application relates to systems and methods for monitoring pipeline routes and leak detection of pipelines.

BACKGROUND

Long distance pipeline networks transport products between cities, countries and even continents. Pipeline networks are widespread, running alternately through remote and densely populated regions. Nearly three million miles of pipeline transporting natural gas, oil, refined products and other hazardous liquids crisscross the United States. Pipelines transport nearly two-thirds of the country's energy supply and convey flammable or explosive materials. Therefore, improving pipelines' safety and security is critical for not only securing "the Veins of the American Economy" but also eliminating any potential chance on public injury, destruction of property, and environmental damage.

Pipelines are generally laid at a depth of about 3 to 6 feet (0.91 to 1.83 m) because the temperature underground is less variable. However, in some cases, it is necessary to cross a valley or a river on a pipeline bridge. Pipelines for centralized heating systems are often laid on the ground or overhead. Pipelines for petroleum running through permafrost areas as the Trans-Alaska-Pipeline are often run overhead to avoid melting the frozen ground from hot petroleum which would result in sinking the pipeline in the ground.

Oil pipelines are made from steel with inner diameter from 4 to 48 inches (100 to 1,220 mm). Natural gas pipelines are constructed of carbon steel and vary in size from 2 to 60 inches (51 to 1,524 mm) in diameter, depending on the type of pipeline. Because pipelines are usually metal, this helps to reduce the expansion and shrinkage that can occur with weather changes.

Many pipelines today are controlled by computerized Supervisory Control and Data Acquisition (SCADA) systems. Through SCADA systems, a pipeline operator can control thousands of miles of pipeline from one central location.

The SCADA system at a central control center of a pipeline operator receives the field data and presents it to the pipeline operator through a set of screens or other human machine interface, showing the operational conditions of the pipeline. The pipeline operator can monitor the hydraulic conditions of the pipeline, as well as send operational commands (open/close valves, turn on/off compressors or pumps, change/set points, etc.) through the SCADA system to field devices in the pipeline network.

Field devices include instrumentation, data gathering units and communication systems. The field instrumentation includes pressure, flow and temperature gauges/sensors/transmitters, and other devices to measure the relevant data required. These instruments are installed externally along the pipeline on some specific locations above-ground, such as injection or delivery stations, pump stations (liquid pipelines) or compressor stations (gas pipelines), or block valve stations.

The information measured by these field instruments is then gathered in local Remote Terminal Units (RTU) that transfer the field data to a central location in real time using communication systems, such as fiber optics, satellite channels, microwave links, or cellular phone connections.

A conventional leak detection system is based on several models, which provide continuous monitoring of pressures, temperatures, and flow at some points along the pipeline with automated analysis. Leak detection is monitored through the SCADA system that assesses pressure and volume flow periodically, e.g. every 5 seconds. To optimize and secure the operation of pipelines, "Advanced Pipeline Applications", are installed with the SCADA system and provide extended functionality to perform leak detection, leak location, batch tracking (liquid lines), pig tracking, composition tracking, predictive modeling, look ahead modeling, and operator training.

U.S. Pat. No. 6,970,808B2 filed on Sep. Apr. 29, 2004 entitled "Real time computer assisted leak detection/location reporting and inventory loss monitoring system of pipeline network systems" states that most conventional pipeline leak detection systems have failed in terms of response time, sensitivity, robustness and cost. It describes a flow model to characterize flow behavior, a deterministic model to evaluate pipeline network status based on the Lyapunov Stability Theory, and a deviation matrix based on the flow model and the deterministic model to generate eigenvalue for a leak alarm.

However, the SCADA systems for pipelines can not collect real time data completely all over the whole pipeline and are not able to establish adequate and accurate data profiles for every position along the pipeline. This absolutely limits the sensitivity, efficiency and reliability of the SCADA system and its leak detection system.

U.S. Pat. No. 8,479,566 B2 filed on Jun. 16, 2009 entitled "Pipeline leak detection system" describes a system to install pressure sensors positioned at regular spaced intervals along the pipeline to establish pressure profiles for leaking detection. However, by drilling holes on the pipeline to install more sensors for collecting more data may downgrade the pipeline's integrity, strength and reliability. Thus, it may increase the chance of causing pipeline leaking or accident. In addition, it is also limited to certain positions and cannot form adequate and accurate pressure profiles along the entire pipeline.

To improve the sensitivity, effectiveness and reliability of SCADA and its leak detection system, adequate and accurate data profiles of the pipeline need to be established. Moreover, the SCADA system and its leak detection system may not detect a pinhole leak that only releases small quantities (<1.5% flow). When undetected, such pinhole leaks can accumulate into a substantive spill. Even with pipeline leak volumes within SCADA detection limits, sometimes pipeline leaks are misinterpreted by pipeline operators to be pump malfunctions or other problems. So, small leaks are a challenging problem for pipeline operators today because they are very difficult to detect and pose a large threat to environment and public safety. Often, the decisions of pipeline operations such as alarm event handling, emergency shutdown, pipeline leak detection and batch tracking are mostly based on the experience of the operator or on Advanced Pipeline Applications Tools with different modeling and limited predictive accuracy.

Therefore, one of the objectives is to establish adequate and high-accuracy continuous data profiles along the pipeline route, so that the sensitivity, effectiveness and reliability of SCADA and its leak detection system can be improved significantly; functionalities of SCADA system can be enhanced; and the service level and quality can be upgraded.

SUMMARY

In one or more first aspects, a robotic detector is configured for inline inspection of a pipeline and comprises a detecting head including a digital radiographic camera, front movable part and a front base part. The front parts include an inspection device cart including a plurality of sensors configured to detect one or more of: radial displacement, pressure, temperature, flows, and acoustics in the pipeline and a carrier rack attached to the front parts and the inspection device cart, wherein the carrier rack is configured to contract in response to deformation, obstructions, or a compression force exerted on the inspection device cart by a wall of the pipeline.

In one or more second aspects, a robotic detector is configured for inline inspection of a pipeline and includes front parts having a front turbine wheel and an inspection device cart. The inspection device cart includes a plurality of sensors configured to detect one or more of: radial displacement, pressure, temperature, flows, and acoustics in the pipeline and an antenna configured to interact with a wall of the pipeline to detect very-low or ultra-low frequency signals from an intelligent gateway, wherein the very-low or ultra-low frequency signals include geo-data associated with the robotic device.

In one or more third aspects, a method of communication with a robotic detector configured for inline inspection of a pipeline includes transmitting by the robotic detector a magnetic field signal through the pipeline and detecting the magnetic field signal by a companion device external to the pipeline. The method further includes determining location information in response to detecting the magnetic field signal by the companioning device and generating a message to a gateway. The method may further comprise receiving the location information by the gateway; generating very-low or ultra-low frequency modulated signals including the location information; and transmitting the very-low or ultra-low frequency modulated signals through the pipeline to the robotic detector.

DETAILED DESCRIPTION

The word "exemplary" or "embodiment" is used herein to mean "serving as an example, instance, or illustration." Any implementation or aspect described herein as "exemplary" or as an "embodiment" is not necessarily to be construed as preferred or advantageous over other aspects of the disclosure. Likewise, the term "aspects" does not require that all aspects of the disclosure include the discussed feature, advantage, or mode of operation.

Embodiments will now be described in detail with reference to the accompanying drawings. In the following description, numerous specific details are set forth in order to provide an understanding of the aspects described herein. It will be apparent, however, to one skilled in the art, that these and other aspects may be practiced without some or all of these specific components or with alternate components. In addition, well known steps in a method of a process may be omitted presented herein in order not to obscure the aspects of the disclosure. Similarly, well known components in a device may be omitted from figures and descriptions thereof presented herein in order not to obscure the aspects of the disclosure. Pipeline failures are often the result of corrosion, equipment failure, manufacturing error, environmental incidents, and human interference.

To detect and prevent pipe failures, operators and regulators conduct regular inspections. Inspections generally target typical pipeline vulnerabilities and defects including loss of coatings, corrosion, stress corrosion cracking (SCC), deformations, and circumferential and axial flaws.

Maintenance of pipelines includes checking cathodic protection levels for the proper range, surveillance for construction, erosion, or leaks by foot, land vehicle, boat, or air, and running cleaning pigs, when there is anything carried in the pipeline that is corrosive.

Inline inspection or inspecting deep water pipelines is complicated. Inspections can be lengthy and costly. When investigating potential defects, it is very hard and challenging to collect the high-quality inspection data required to make accurate assessments. The common methods of inspection, which can be costly and time-consuming, often fail to generate the high-resolution data necessary for proper assessment of the pipeline.

Sophisticated and sensitive inline inspection (ILI) tools travel through the pipe and measure and record irregularities that may represent corrosion, cracks, laminations, deformations (dents, gouges, etc.), or other defects. Because they run inside the pipe in a manner similar to the scrubbing and scraping devices known as "pigs", these inline inspection tools are often referred to as "smart pigs". Although ultrasound testing has been applied to corrosion and crack detection, Electromagnetic Acoustic Transducer (EMAT) technology also involves the generation of ultrasonic acoustic waves in electrically and magnetically conductive materials by the combined interaction of magnetic fields together with a relatively high frequency (RF) field generated by electrical coils Inline inspection technologies with Non-destructive testing (NDT) methods are mostly dominated by Magnetic flux leakage (MFL) testing for detecting corrosion manifest metal loss, as well as crack.

However, all kinds of inline inspection tools are propelled by the pressure of the product in the pipeline itself currently; and inline inspection technologies based on magnetic flux leakage (MFL) testing, ultrasound testing, electromagnetic acoustic transducer (EMAT) are not complement to the pipeline's SCADA systems. U.S. Provisional Patent Application No. 62/790,971 filed on Jan. 10, 2019 entitled, "Rechargeable Power System and Method for Pipeline Inspection Tools" describes a smart inline inspection tool with rechargeable power system for self-propelled inline inspection tool and adaptive control.

U.S. Provisional Patent Application No. 62/816,008 filed on Mar. 8, 2019 entitled "Self-Adaptive System Structure and Method for An Inline Inspection Vehicle of Pipelines" which is hereby incorporated by reference herein, describes an inline inspection vehicle with auto-adjustable and self-adaptive structure, self-propelled feature, and rechargeable power system, which could be a backbone to construct the intelligent inline data acquisition devices described herein.

One of the present embodiments includes a robotic detector and intelligent gateway. The robotic detector is an intelligent device running inline inspection and data acquisition; it has two groups of real time sensors at both front and rear to measure pressures, temperatures, and flows, it also equipped with radial displacement sensors, acoustic sensors and a digital radiographic camera or Electromagnetic Acoustic Transducer (EMAT) at the head and front, and a rechargeable power system at the rear. A GPS positioning module and communicator are integrated with a computer system to communicate with the intelligent gateway. Real time data is obtained and processed with modeling for system identification and analysis and then mapped/labeled with the geo-positions received from the intelligent gateway.

Based on the data results or commands from the intelligent gateway, the robotic detector's moving speed and position can be adjusted by the adaptive controller, so that the robotic detector can collect more reliable data in both digital and graphic format for verifications and update. The data results are finally transferred to the intelligent gateway and can be shared with a SCADA system to establish high-quality, high-accuracy continuous pressure, flow and temperature profiles along the pipeline route. The system can thus effectively improve the chance of leak prediction and detection and determine leaking position accurately including tiny or pinhole leaking.

Figure 1:
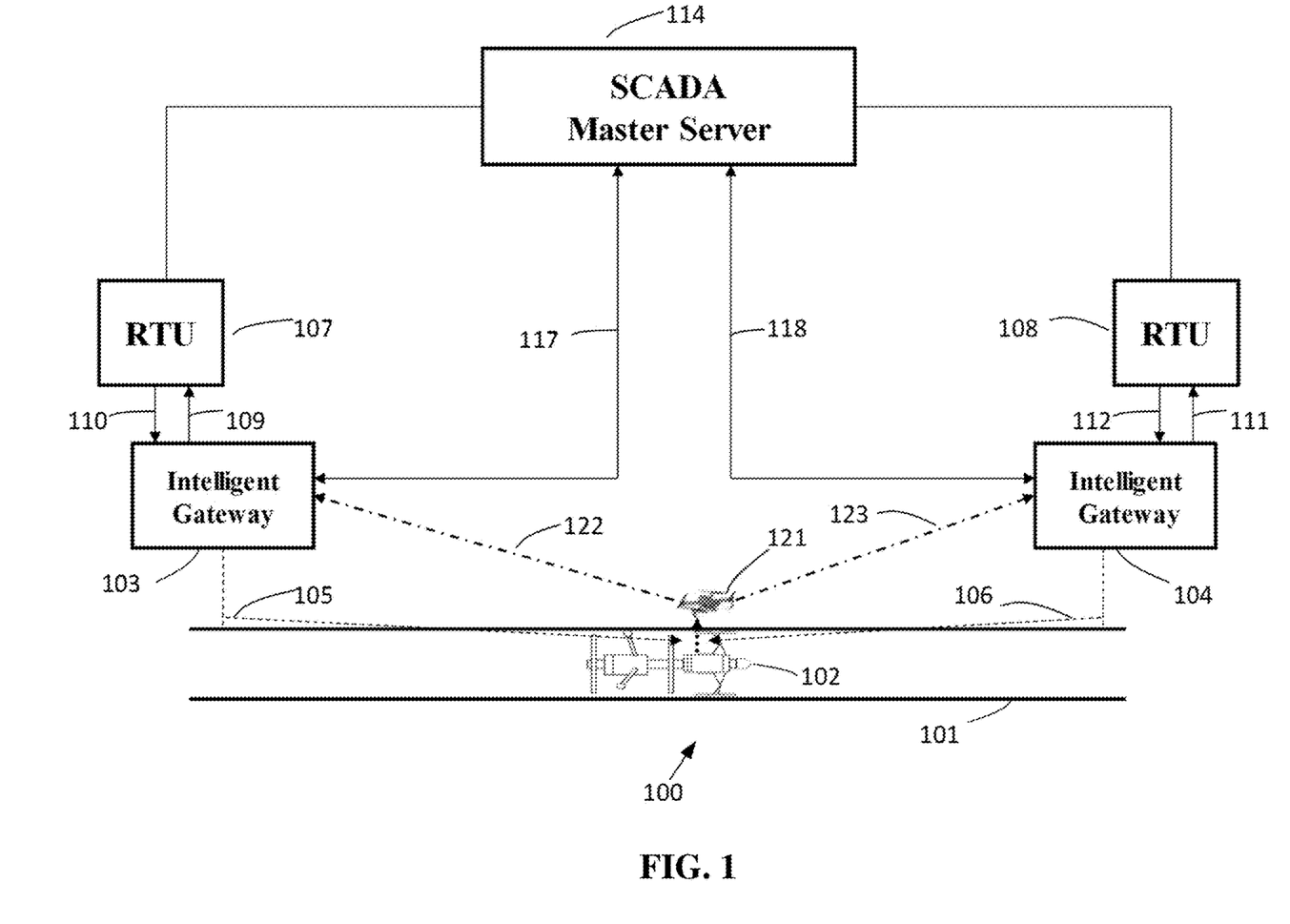
FIG. 1 illustrates a schematic block diagram of an embodiment of an infrastructure of a data acquisition system.

FIG. 1 illustrates a schematic block diagram of an embodiment of an infrastructure of a data acquisition system 100. Similarly, as "pigs", in FIG. 1, Inline Robotic Detector 102 in the present embodiment can be launched from pig-launcher stations and travel through the pipeline 101 to be received at any other station downstream. At both launching station (upstream) and receiving station (downstream), the upstream Intelligent Gateway 103 and downstream Intelligent Gateway 104 in the present example embodiment may transmit real time data 105, 106 to Inline Robotic Detector 102. The Intelligent Gateways 103, 104 receive geo-positioning data 122, 123 from companioning device 121, e.g. a drone or other vehicle configured to track a position of the Inline Robotic Detector 102. Since two way communications through the pipeline 101 are difficult between Inline Robotic Detector 102 and the Intelligent Gateways 103, 104, one way communication can be implemented with Earth Mode communication, which is further described herein with reference to FIG. 4.

But conversely to "pigs", Inline Robotic Detector 102 in the present example embodiment can be a complement to SCADA systems because it collects real time data and measurements such as pressures, temperatures, and flow profiles along the pipeline route. The data and measurements are compatible with existing Supervisory Control and Data Acquisition (SCADA) systems or with other such control and data acquisition systems.

By acquiring real time data, such as pressures, temperatures, and flow profiles continuously along the pipeline, the Intelligent Gateways 103 and 104 may be integrated with existing SCADA systems. In an embodiment, the SCADA system includes an upstream RTU 107, downstream RTU 108, and SCADA Master Server 114 as well as leak detection systems to provide higher quality monitoring services, to predict and locate or detect pipeline leaking more quickly and accurately. Communications 109, 110 between the upstream Intelligent Gateway 103 and RTU 107, the communications 111, 112 between the downstream Intelligent Gateway 104 and RTU 108, as well as the communications 117, 118 between SCADA Master Server 114 and Intelligent Gateways 103, 104 are all two-way communications through existing telecommunication networks and facilities.

Figure 2:
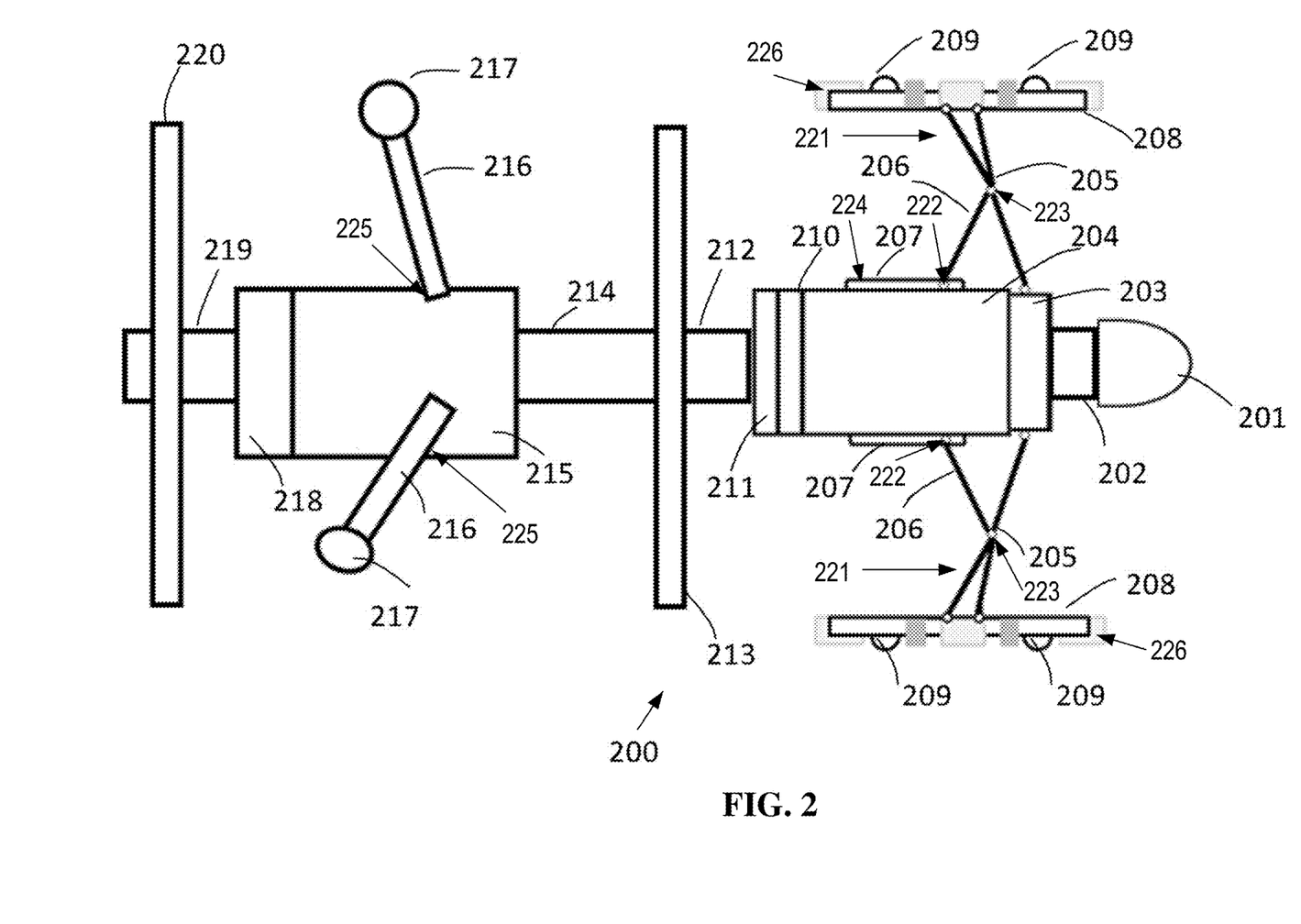
FIG. 2 illustrates a schematic block diagram of an embodiment of an inline robotic detector.

FIG. 2 illustrates an example embodiment of the inline robotic detector 200 in more detail. The robotic detector 200 is an intelligent pipeline inspection tool that collects a plurality of pipeline condition data more efficiently and safely. It is also a specially architected machine with robotic principles and features properly designed for different pipeline environments. The robotic detector 200 includes the inline inspection vehicle with auto-adjustable and self-adaptive structure, self-propelled feature, and rechargeable power system as described in U.S. Provisional Patent Application No. U.S. 62/816,008 filed on Mar. 8, 2019 entitled "Self-Adaptive System Structure and Method for An Inline Inspection Vehicle of Pipelines," which is hereby incorporated by reference herein.

The robotic detector 200 has a detecting head 201 and a neck 202 that is configured as an operating lever and an actuator for the detecting head 201. The front body of the robotic detector 200 has a front base part 204 and a movable part 203. The movable part 203 is controlled by the actuator 210 to move forward or backward horizontally to adjust a size and position of the carrier racks 221 of the inspection device carts 208.

The carrier rack 221 includes a main strut 205 and an auxiliary strut 206. The bottom of auxiliary strut 206 is a roller 222 which is secured to the front base part 204 by a guided slide rail track 207 while the bottom of the main strut 205 is fixedly secured to the front base part 204. The roller 222 at the bottom of the auxiliary strut 206 may move in both a forward and backwards direction along the slide rail track 207. The other ends of the auxiliary strut 206 and main strut are secured by a pivot or rotating means 223.

In use, as the auxiliary strut 206 moves backward along the roller 222, the carrier rack 221 contracts and the inspection device cart 208 moves closer to the front base part 204. As the auxiliary strut 206 moves forward along the roller 222, the carrier rack 211 extends and the inspection device cart 208 moves away from the front base part 204. The upper part of main strut 205 includes two prongs attached at two points to the inspection device cart to form a v-like structure to support the inspection device cart 208. The positioning roller(s) 209 mounted on the device cart 208 assist in guiding the robotic detector's movement smoothly by interacting with the pipe's inner wall.

In an embodiment, when the pipeline contracts or a deformation or obstruction occurs, a compression force is exerted on the inspection device cart by a wall of the pipeline or by the deformation/obstruction. In response thereto, the positioning rollers 209 compress the inspection device cart 208 and move the auxiliary strut 206 backwards along the roller 222 to move the inspection device cart 208 towards the front base part 204. A spring or other tension device 224 continuously pushes the roller 222 forward. When the pipeline expands or the deformation/obstruction clears, the positioning rollers 209 exert less compression on the inspection device cart 208 such that the tension device 224 pushes the auxiliary strut 206 forward along the roller 222 to move the inspection device cart 208 further from the front base part 204. The inspection device cart 208 thus remains positioned closely adjacent to the walls as the pipeline expands and contracts. The inspection device cart 208 may include one or more measurement devices 226, such as devices for measuring radial displacement, pressure, temperature, velocity of fluid flow, etc.

In addition or alternatively, the actuator 210 may control the movable part 203 to move forward or backward horizontally from the front base part 204 to adjust a size and position of the carrier racks 221. The distance between the inspection device carts 208 and the front base part 204 is thus adjustable.

The actuator 211 controls the front adjustable turbine wheel 213 through the front steering axis 212; similarly, actuator 218 controls the back adjustable turbine wheel 220 through the back steering axis 219. The actuators 211, 218 control a speed of the turbine wheels 213, 220 to control a velocity of the robotic detector 200 in the pipeline 101. The actuators 211, 218 may also control a tilt of the turbine wheels 213, 220 to change a direction of the robotic detector 200. Both the front base part 204 and back body 215 are connected with a universal joint 214 working like a hip wrist to be suitable for different shapes of pipelines. The universal joint allows the front base part to rotate with respect to the back body such that the front base part may be at an angle with respect to the back body. The robotic detector 200 employs the two adjustable turbine wheels to control its speeds as well to reverse its movements. In most situations, the turbine wheels use inertial propulsion driven by fluid dynamics such as moving oil or gas, so it is an extremely efficient design with minimized energy consumption.

The back-positioning rollers 217 with supporting struts 216 are connected via a hinge or other pivoting means 225 to the back body 215. A spring or other tensioning device exerts a force to hold the supporting struts 216 relatively perpendicular to the back body 215. When the pipeline wall interacts with or exerts pressure on the back-positioning rollers 217 greater than the tension force of the tensioning device, the supporting struts 216 rotate towards the back body 215. The supporting struts 216 and back positioning rollers 217 assist in positioning the vehicle 102 centrally within the pipeline.

In addition, the adjustable rollers 217 and inspection device carts 208 are able to assist in controlling movements of the robotic detector 201 and help to stop the robotic detector 201 at a certain position for further investigations and measurements. The adjustable rollers 217 and inspection device carts 208 assist in positioning to navigate the robotic detector's movement to prevent possible collisions with the inner wall of the pipeline.

This embodiment is an example and other components may be implemented in addition to or alternatively to those described. For example, though only two supporting struts 216 and back positioning rollers 217 are illustrated, additional supporting struts 216 and back positioning rollers 217 may be implemented. Similarly, additional inspection device carts 208 or carrier racks 221 may be implemented or additional inspection device cart 208 and carrier rack 221 in reversed configuration may be implemented as described in U.S. Provisional Patent Application No. U.S. 62/816,008 filed on Mar. 8, 2019 entitled "Self-Adaptive System Structure and Method for An Inline Inspection Vehicle of Pipelines."

Figure 3:
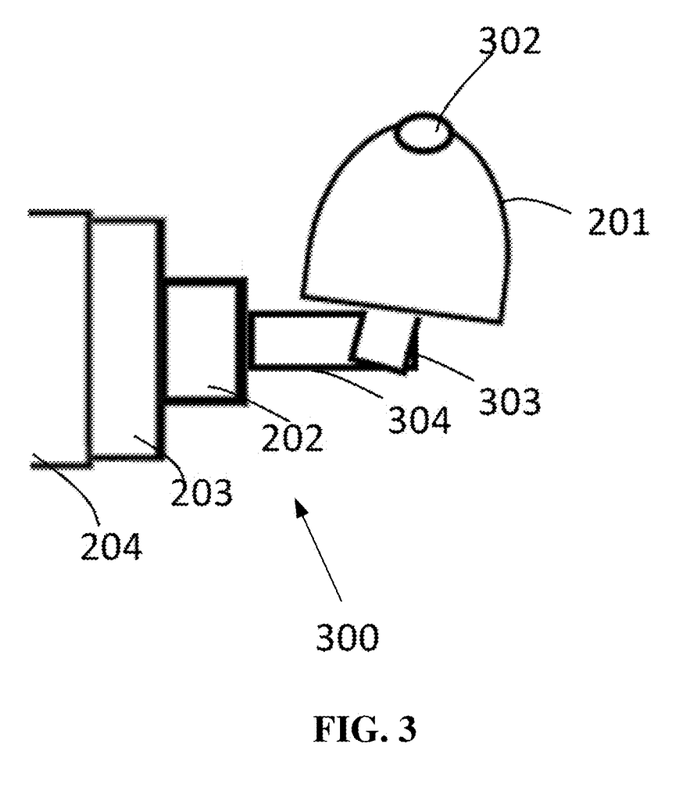
FIG. 3 illustrates a schematic block diagram of an embodiment of a front portion of the robotic detector in more detail.

FIG. 3 illustrates a schematic block diagram of an embodiment of a front portion 300 of the robotic detector 200 in more detail. The detecting head 201 is equipped with a digital radiographic camera 302. The neck 202 of the robotic detector 200 includes an actuator mounted on the upper body 203 that controls the operating lever 304, as well as the front arm 303. The operating lever 304 and arm 303 operate to provide six degrees of freedom to turn the detecting head 201 up, down, forward or backward, or even rotate around within a 360-degree circle either clockwise or counter clockwise.

The robotic detector 200 may use digital radiographic testing methods for pipelines. The digital radiographic camera 302 may be equipped on the detecting head 201 with an adjustable cover for the lance. The robotic detector 200 can make self-tuning on its head to target the right direction/position for further investigations It has been a big challenge to determine the position and attitude of an inline inspection tool along its trajectory within the pipe. Traditionally, an Inertial Navigation System may be comprised of an Inertial Measurement Unit (IMU) and post processing software loaded on a computer that may be used to perform the navigation function. However, odometer measurements with IMU may not be very reliable and accurate for determining the location of pipeline defects because of typical mechanical breakdowns inherent in most movable parts that may result in odometer wear and slippage, as well as horizontal chaining errors. To improve the results in the IMU, timer boxes or above ground makers (AGM) are used as GPS control points every 1-5 kilometers along the pipeline. The inertial data must be tied to these points using an accurate clock synchronized to the time in the in-line inspection tool, a magnetic sensor capable of detecting the magnetic field generated by the passage of the in-line inspection tool and a recording system.

Figure 4:
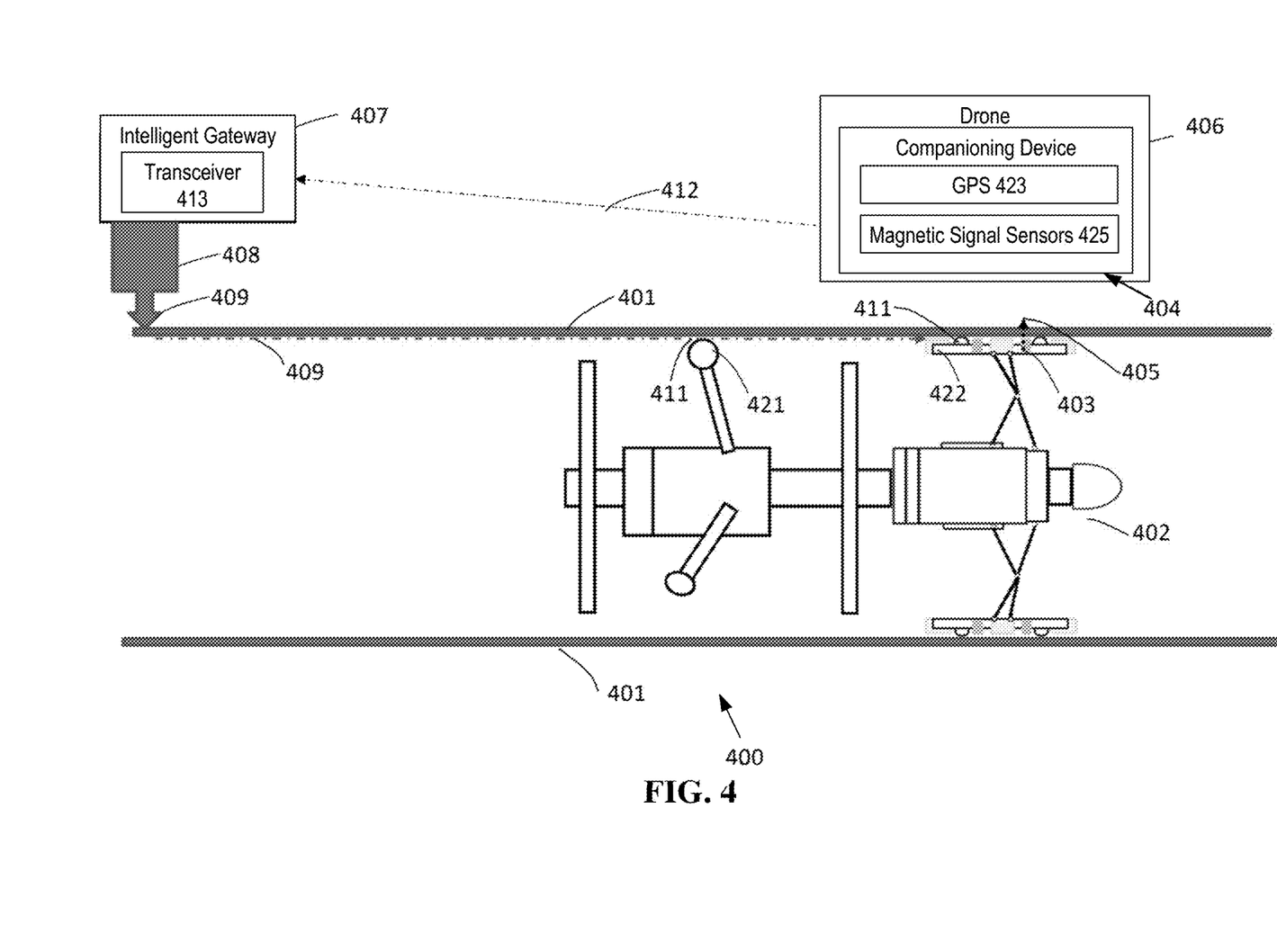
FIG. 4 illustrates a schematic block diagram of an embodiment of a pipeline communication system with the robotic detector.

FIG. 4 illustrates a schematic block diagram of an example embodiment of a pipeline communication system with the robotic detector 402. In an embodiment, the Intelligent Data Acquisition System and Method for Pipelines 400 described herein includes a real time positioning system based on a special communication infrastructure and mechanism. A companioning device 404 is carried by or implemented in an unmanned vehicle, such as a drone 406 in FIG. 4, but may alternatively be carried by or implemented in a robot, a manned vehicle or other type of vehicle. However, for offshore pipelines, the companioning device 404 may be included in a boat or underwater vehicle. The companioning device 404 is configured to report positions of the robotic detector 402 to a transceiver 413 in an intelligent gateway 407. The transceiver 413 and companioning device 404 may communicate through different wireless or wireline communication protocols over one or more of a LAN, MAN and/or WAN. In one aspect, the companioning device 404 may include a wireless transceiver for communicating over a radio network, cellular network, satellite network or other wireless WAN. The transceiver 413 may also include a wired transceiver interface, e.g., a USB port or other type of wired connection, for communication with one or more other devices over a LAN, MAN and/or WAN.

In use above ground, the drone 406 or another device including the companioning device 404 follows or tracks the robotic detector 402 in the pipeline 401. The companioning device 404 includes magnetic signal sensors 425 and a GPS 423 that track the positions and movements of the robotic detector 402 by detecting magnetic field signals 405 from the robotic detector 402 with magnetic signal sensors 425. The robotic detector 402 includes a magnetic device 403, such as a magnetic and/or magnetic flux leakage (MFL) module, e.g. positioned on the inspection device cart 208 of robotic detector 402. The magnetic device 403 generates magnetic field signals 405 in the pipeline and through the earth and/or air for communication with the companioning device 404.

The companioning device 404 tracks the robotic detector 402 in the pipeline 401 using the magnetic fields signals 405 and determines its geo-positions with the GPS 423. The companioning device 404 periodically communicates messages to report its GPS coordinates as the location of the robotic detector 402 to the intelligent gateway 407. The robotic detector 402 may occasionally adjust its speeds and states for different inspection points. The companioning detector 404 detects the magnetic field signals 405 from the robotic detector 402 and communicates instructions to the drone to adjust a pace or direction. The drone 406 is configured to follow the robotic detector 402 properly by following the pipeline 401 and/or instructions from the companioning device 404.

As the carrier of the companioning device 404, the drone 406 may also include a video camera to inspect the pipeline 401 externally to detect any cracks, damage or risk from weather or natural forces as well third-party threats like potential excavation damages. The drone 406 may thus enhance the pipeline's security system with additional monitoring at the same time.

Ultra-low frequency (ULF) is the ITU designation for the frequency range of electromagnetic waves between 300 hertz and 3 kilohertz. Many types of waves in the ULF frequency band can be observed in the magnetosphere and on the ground. Communications through the ground using conduction fields is known as "Earth-Mode" communications and was first used in World War I. The transmission equipment was known as the 'Power Buzzer', an electromechanical device which produced 700 hertz pulsed DC at a high voltage. This band is also used for communications in mines, because it can penetrate the earth. Some experiments have been tried at 0.83-8.76 kilohertz including both ULF and VLF (3-30 kilohertz) bandwidths with some success and proved that buried pipes and cables may help conduction in some directions, so attenuation may be less than expected.

In an embodiment, the intelligent gateway 407 uses a transceiver 408 to generate low frequency (ULF or VLF) signals and modulate the ULF or VLF signals using geo-data in wireless messages 412 from the companioning device 404. The geo-data includes location information, such as latitude, longitude, elevation, etc. from the companioning device 404. The intelligent gateway 407 transmits the geo-data to the robotic detector 402 through the "Earth-Mode" communication signals 409.

At the robotic detector 402, one or more antennas 411 are mounted on the rollers 421 and inspection device carts 422 for effectively interacting with the inner wall of the pipe and detecting the "Earth-Mode" communication signals 409. The communication signals 409 are processed by a communicator and GPS positioning module on the robotic detector 402. The robotic detector 402 may determine its geographical position in response to a communication time delay and the geo-data, including latitude, longitude and elevation. During a stop state, the robotic detector 402 may receive the "Earth-Mode" communication signals 409 most effectively and correctly. The robotic detector 402 may thus more accurately determine its position and associate its position with measurements of the pipeline.

Because the diameters of oil pipelines range from 4 to 48 inches (100 to 1,220 mm) and natural gas pipelines vary in size from 2 to 60 inches (51 to 1,524 mm) in diameter, the sizes of robotic detector 200 are accordingly different with multiple levels to form a model family for efficiently and effectively working in different sizes of pipelines.

As an intelligent pipeline inspection tool, the robotic detector 200 performs data collection and inspection tasks inside pipelines. It includes artificial intelligence to autonomously move in the pipeline. Its motion can be modeled, planned, sensed and controlled, and its behavior can be well-programmed.

Figure 5:
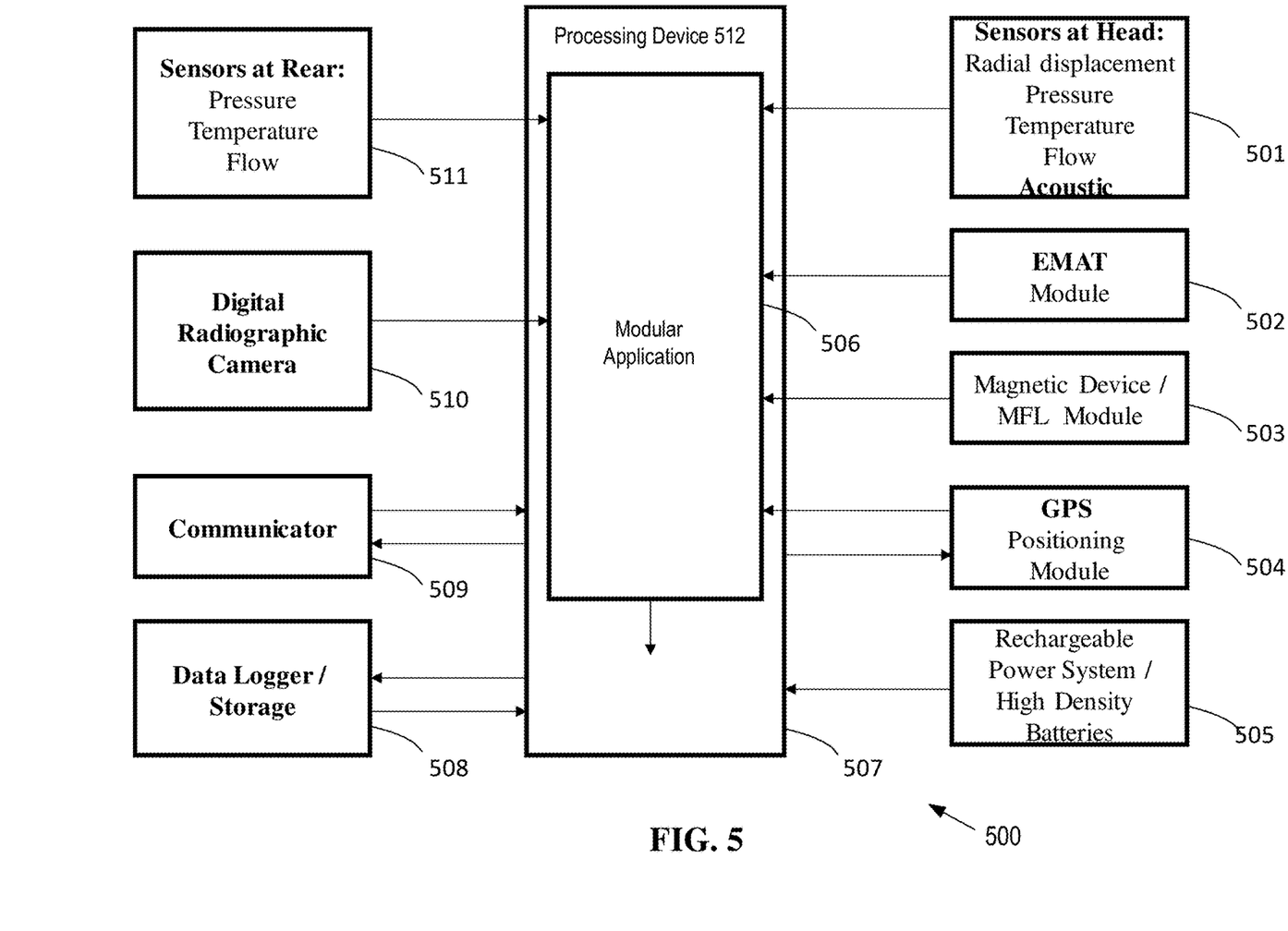
FIG. 5 illustrates a schematic block diagram of an embodiment of exemplary components of the robotic detector.

FIG. 5 illustrates a schematic block diagram of an embodiment of exemplary components of the robotic detector 500. Head sensors 501 are implemented in the detecting head 201 of the robotic detector 500. The head sensors 501 include, e.g. a radial displacement sensor, pressure sensor, temperature sensor, flow sensor and acoustic sensor. The radial displacement sensor is used to test the pipe's geometry abnormalities or deformation. Rear sensors 511 are implemented, e.g., in the back body 215.

The modular application 506 is implemented on the processing device 512. The modular application 506 includes instructions and data which when performed by the processing device 512 accomplishes one or more functions described herein. The modular application 506 implements various processes for, e.g., system identification, system analysis and verification, system modeling based on Advanced Control, Neural Networks and Deep Learning Theory, Computational Fluid Dynamics using data input from sensors 501 and 511 to generate outputs for adaptive controller (described with respect to FIG. 6). The Electro Magnetic Acoustic Transducer (EMAT) module 502 and MFL module 503 are optional for this robotic detector, but either a magnetic device or MFL module 503 should be installed, or both are implemented in module 503 to generate magnetic fields and signals for communication purposes with the companioning device 404 as described with respect to FIG. 4. The communicator 509 and GPS positioning module 504 should work together with advanced algorithms to map and label data collected with GPS coordinates.

Data logger and storage 508 implements a redundant array of independent disks (RAID) with high capacity and reliability to store the geo-mapped data and archive pre-processed historic data and patterns, e.g. for a deep learning mechanism in modular application 506. Based on the assessments and evaluations by the Computational Risk Modeling System in U.S. Provisional Patent Application No. 62/809,115 filed on Feb. 22, 2019, which is hereby incorporated by reference herein, identified threats and risk drivers may also be loaded into data logger and storage 508. The geo positions that are labeled with threats and risk drivers are flagged as control points for detail investigations in the inspection process. The pipeline failure mechanism learning module in U.S. Provisional Patent Application No. 62/809,115 could also be implemented in the modular application 506 to help identify any risk driver or determine a potential failure mode.

Figure 6:
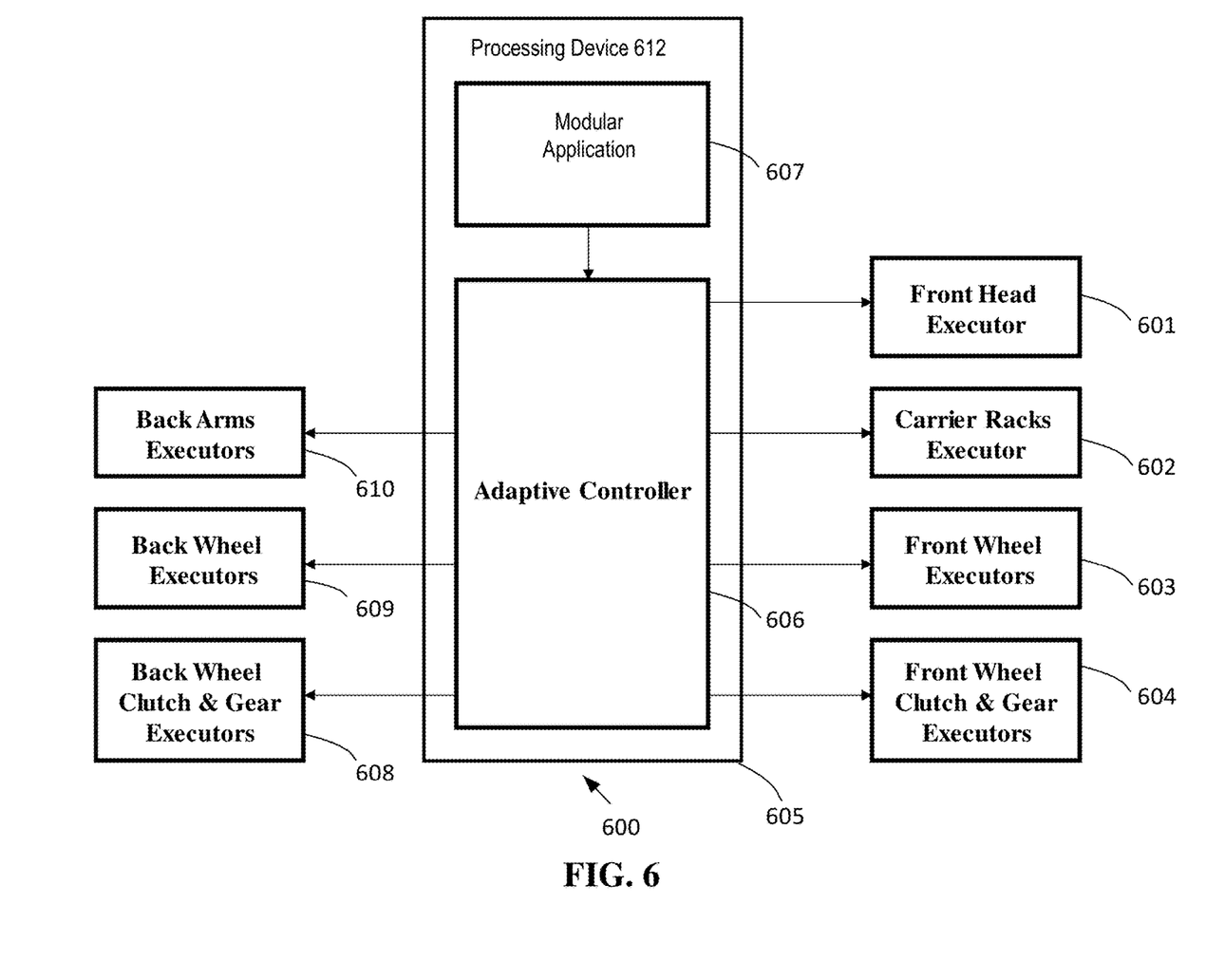
FIG. 6 illustrates the intelligent adaptive control system of the robotic detector.

All components and software are supported by the processing device 507 in FIG. 5 or processing device 605 in FIG. 6. The processing device 507 in FIG. 5 is powered by the rechargeable power system with high density batteries 505 which is defined in U.S. Provisional Patent Application No. 62/790,971 filed on Jan. 10, 2019.

There are two groups of sensors in the robotic detector 200 demonstrated in FIG. 5. The rear sensors 511 with multiple sensors for pressure, temperature, and flow are mounted in the rear part while the head sensors 501 are set in the detector's front part. Data collected by both group of sensors are evaluated and analyzed by the modular application 506 based on deterministic criteria. For both the head and rear sensors 501, 511, multiple sensors for pressure, temperature, and flow are located at different positions on radial circles by following configuration or distribution rules. Both the deterministic criteria and the configuration/distribution rules are based on Lyapunov stability theory. The results with unsteady states may indicate abnormality or potential leaking which may trigger further investigations. This process may be referred to as virtual pressure testing.

The extremely sensitive acoustic sensors 501 are mounted in the detecting head 201 and are configured to detect sounds indicating leakage or product loss while the robotic detector 200 traverses the pipeline. The acoustic sensors 501 may directly detect even a tiny or pinhole leak. The discovery of a leak by the acoustic sensors 501 may generate new commands or work requests for the operation of the digital radiographic camera 510. The digital radiographic camera 510 may obtain images or video necessary for further evaluation and verification of the possible leak.

The robotic detector 402 may also detect other anomalies in the pipeline, such as dents, metal loss caused by corrosion, cracking, deformations, or other mechanical damage, e.g. using the digital radiographic camera 510. The digital radiographic camera 510 generates high-resolution image data that may be assessed to determine these anomalies. Other types of sensors may also be implemented in the robotic detector.

FIG. 6 illustrates the intelligent adaptive control system 600 of the robotic detector 600. The inspection process of the robotic detector 600 is self-tuning. Since nonlinear and multiple variables with uncertainty are present, adaptive control methodologies and mechanisms are preferably implemented. The intelligent control loop includes elements such as head sensors 501 and rear sensors 511, EMAT and Magnetic Device/MFL modules 502, 503, analyzer and planner with modular application 607, 506, adaptive controller 606 and executors 601-608. The executors 601-608 include a front head executor 601, carrier racks executor 602, front wheel executors 603, front wheel clutch & gear executors 604, back arm executors 610, back wheel executors 609, and back wheel clutch & gear executors 608.

The modular application 607, 506 implements processes for system identification, system analysis and verification, and system modeling. It is a key component by combining Feedback Loops, analyzer and planner as well as dynamic knowledge base for sharing information along the control loop. The executors 601-608 use data relating to the relationship between state variables from models and actuators to direct actions to the hardware proxies such that the system will respond correctly to meet the operational goals. The feedback loops and intelligent control loop organically cooperate to realize the mechanism of precisely guiding navigation of the robotic detector 402. In U.S. Provisional Patent Application No. U.S. 62/816,008 filed on Mar. 8, 2019 entitled "Self-Adaptive System Structure and Method for An Inline Inspection Vehicle of Pipelines", which is hereby incorporated by reference herein, the self-adaptive schema for a finite set of control states is described for the adaptive control mechanism.

Figure 7:
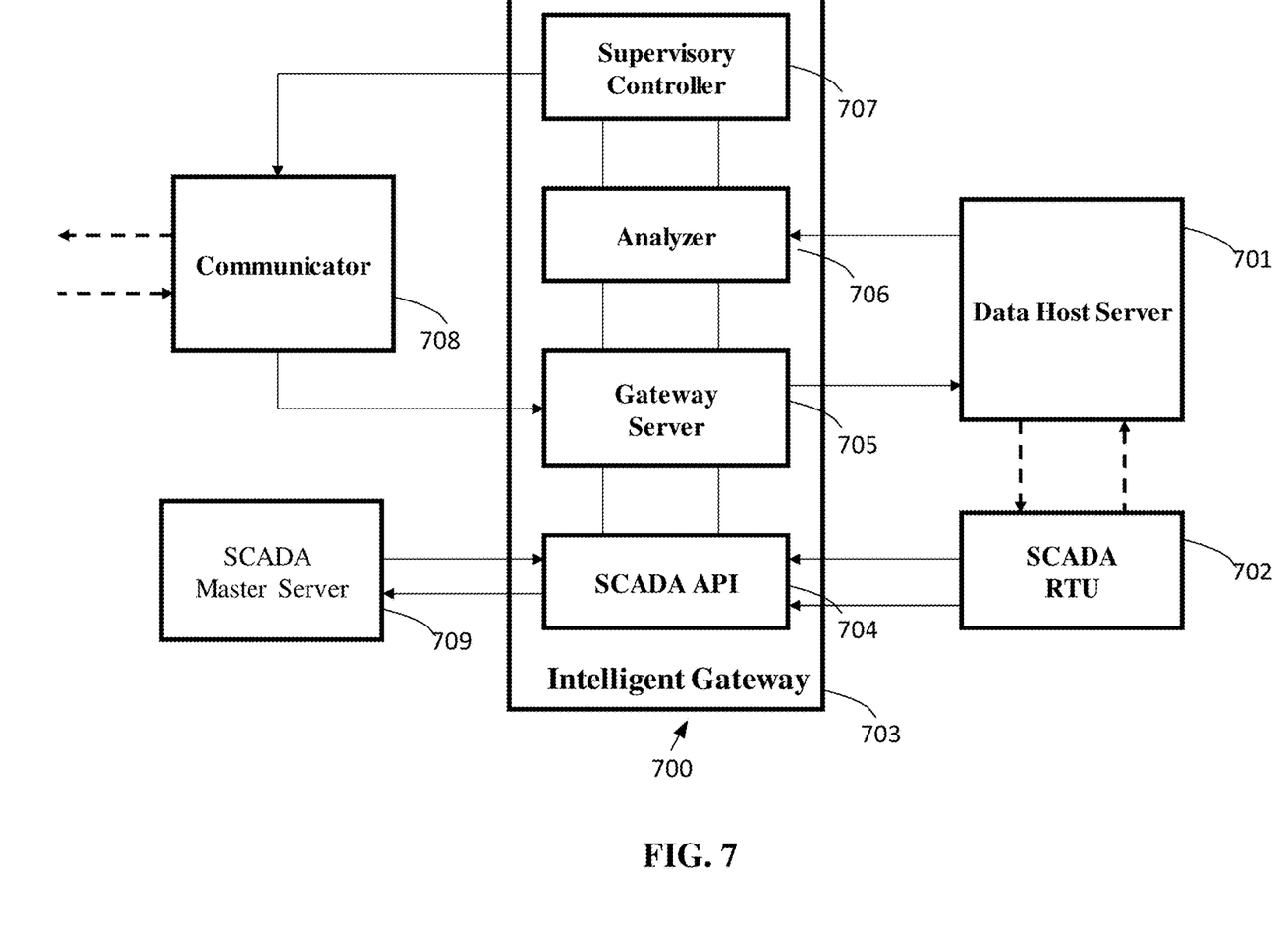
FIG. 7 illustrates a schematic block diagram of an embodiment of an intelligent gateway.

FIG. 7 illustrates a schematic block diagram of an embodiment of the intelligent gateway 700 in the new data acquisition system 100. At the core of intelligent gateway 703 is the gateway server 705. The gateway server 705 includes a high availability and high-performance computer system with a configurable easy-to-use graphical user interface (GUI) for data acquisition and includes at least a processing device and memory device. To implement a scalable strategy to handle large volumes of data, the intelligent gateway 703 couples with a data logger supported by the data host server 701.

In use, when the communicator 708 receives data or signals, it transfers the data to the intelligent gateway 703. The data is then processed by analyzer 706 and stored in data host server 701. Analyzer 706 includes similar functionalities as modular application 506, 607. In an embodiment, the analyzer 706 may include neural network processing or artificial intelligence processing trained with learning algorithms using historic data and existing SCADA systems. For example, the analyzer 706 has supervised learning and deep learning mechanisms based on historic data from both data host server 701 and existing SCADA systems. Supervisory controller 707 implemented with analyzer 706 includes control logic and synthesis based on finite automata and state machine theory. The supervisory controller 707 generates and sends control commands to robotic detector 402 through the communicator 708 so that additional inspection or investigation activities can be requested in the field site.

Based on the assessments and evaluations by the Computational Risk Modeling System described further in U.S. Provisional Patent Application No. 62/809,115 filed on Feb. 22, 2019, which is hereby incorporated by reference herein, threats and risk drivers identified may also be transmitted to Data Host Server 701, SCADA RTU 702, and SCADA Master Server 709. The geo positions labeled for threats and risk drivers are all set as control points for detail investigations in the inspection process and SCADA's critical monitoring points. The pipeline failure mechanism learning module in U.S. Provisional Patent Application No. 62/809,115 may also be implemented in the analyzer 706 to help identify any risk driver or determine the potential failure mode.

The SCADA application program interface (API) 704 provides for integration and data sharing between the intelligent gateway 703 and a SCADA system, e.g. including either or both SCADA RTU 702 and SCADA Master Server 709. Since continuous and accurate pressures, temperature, flow profiles for positions throughout the pipelines are established, the Supervisory Control and Data Acquisition (SCADA) and leak detection systems can provide much higher quality monitoring services, predict and locate or detect pipeline leaking much more quickly and accurately.

Based on the high-quality inspection data especially on the image format collected by digital radiographic camera 302, radial displacement sensors mounted at the head sensors 501, optionally the EMAT module 502 and MFL module 503, the high-resolution data on pipeline vulnerabilities such as corrosion, deformations, and cracking can help proper and accurate assessment of the pipelines, so that maintenance of pipelines become much more efficient in operation and cost effective in investment.

Therefore, the system and methods for data collection and processing in this disclosure is uniquely problem-oriented and risk-based. The abnormality caught by sensors or unsteady states as well as threats and risk drivers identified in previous inspections may trigger further investigations. As such, the procedure is optimized and minimized with essential activities. It constructs an integrated inspection regime to pull together all the major types of pipeline inspections into a more comprehensive, risk-based approach. Moreover, this disclosure also conducts virtual pressure tests to converge the Pipeline Integrity Management with the SCADA monitoring system.

Figure 8:
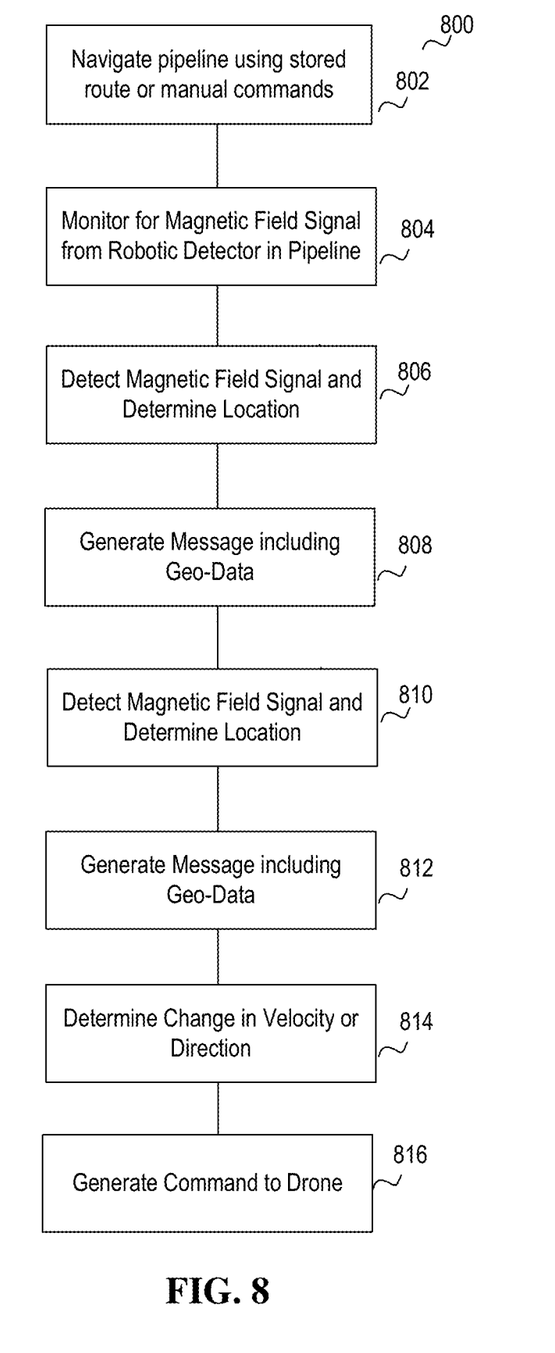
FIG. 8 illustrates a flow diagram of an embodiment of a method of operation of the companioning device in the drone.

FIG. 8 illustrates a flow diagram of an embodiment of a method 800 of operation of the companioning device 404 in the drone 406. The drone navigates the pipeline until it detects the robotic detector 402 at step 802. For example, the drone 406 may be pre-programmed or follow a pre-stored route of the pipeline 401. In another example, the drone may be manually controlled to follow the pipeline 401.

The drone 406 monitors for a magnetic field signal from the robotic detector 402 in the pipeline 401 at step 804. The companioning device 404 includes magnetic signal sensors 425 and a GPS 423 that track the positions and movements of the robotic detector 402 by detecting magnetic field signals 405 from the robotic detector 402 with magnetic signal sensors 425. The robotic detector 402 includes a magnetic device 403, such as a magnetic and/or magnetic flux leakage (MFL) module, e.g. positioned on the inspection device cart 208 of robotic detector 402. The magnetic device 403 generates magnetic field signals 405 for communication with the companioning device 404.

The companioning device 404 tracks the robotic detector 402 in the pipeline 401 using the magnetic fields signals 405 and determines its geo-positions with the GPS 423. When the companioning device 404 detects the magnetic field signal, it determines a location at step 806. For example, the companioning device 404 may determine its current GPS location, including latitude, longitude and elevation. The companioning device 404 may also record a pipeline marker, an image or video of the location or other location information. As it tracks the robotic detector 402, the companioning device 404 periodically generate messages including geo-data of the robotic detector 402. The geo-data may include any of the location information obtained by the companioning device 404. The companioning device 404 transmits the message to report the geo-data to the intelligent gateway 407. The message may be transmitted through a drone operator network and one or more other networks to the intelligent gateway 407.

The companioning device 404 may determine acceleration or de-acceleration of the robotic detector 402 using the magnetic field signals, such as a change in velocity or direction, at step 814. The companioning device 404 may then generate a command to the drone 406 to adjust its speed or direction at step 816. The drone 406 is configured to follow the robotic detector 402 properly by following the pipeline 401 and/or instructions from the companioning device 404. Though a drone 406 is described in this example, other types of vehicles or devices outside the pipeline may be implemented instead of the drone 406. For example, a manned airborne vehicle, a land vehicle or underwater vehicle may include the companioning device 404 and track the robotic detector 402.

Figure 9:
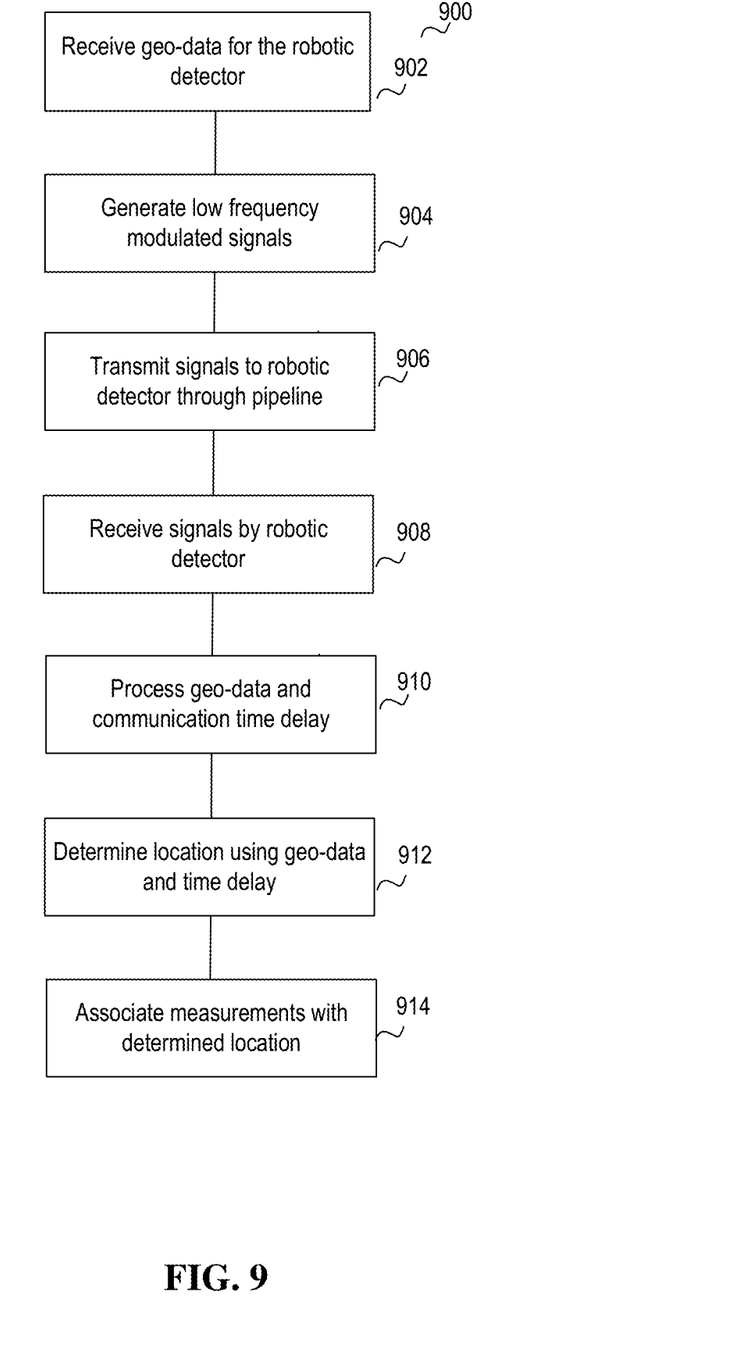
FIG. 9 illustrates a flow diagram of an embodiment of a method of operation of the intelligent gateway.

FIG. 9 illustrates a flow diagram of an embodiment of a method 900 of operation of the intelligent gateway 407. The intelligent gateway 407 receives the geo-data for the robotic detector 402 at step 902. The intelligent gateway 407 generates a modulated low frequency (ULF or VLF) signal including the geo-data at step 904. The geo-data includes location information, such as latitude, longitude, elevation, from the companioning device 404. The signal may also include a time stamp.

The intelligent gateway 407 transmits the geo-data to the robotic detector 402 in the pipeline 401 through the "Earth-Mode" communication signals 409 at step 906. For example, the intelligent gateway 407 injects the VLF or ULF signals between two transmitters or rods coupled to the pipeline or to an earth rod and the pipeline, generating a current flow between them. The "Earth-Mode" communication signals 409 will propagate in a plurality of expanding paths between the two points because the medium has resistance.

The robotic detector 402 may then receive the "Earth-Mode" communication signals 409 and the geo-data at 908. For example, the electrostatic field around the pipe carrying the "Earth-Mode" communication signals 409 may be detected, e.g., with an E-field probe. One or more antennas 411 are mounted on the rollers 421 and/or inspection device carts 422 for effectively interacting with the inner wall of the pipe and detecting the "Earth-Mode" communication signals.

The "Earth-Mode" communication signals 409 are processed by robotic detector 402 with a communication time delay at step 910. The communication time delay may be determined from the time stamp included in the communication signals 409 and an on-board clock of the robotic detector 402. During a stop state, the robotic detector 402 may receive the "Earth-Mode" communication signals 409 more effectively and accurately. The robotic detector 402 may thus determine its location using the geo-data and time delay at step 912. The robotic detector 402 may then associate its location with measurements of the pipeline at step 914.

In one or more aspects herein, a processing module or circuit includes at least one processing device, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A memory is a non-transitory memory device and may be an internal memory or an external memory, and the memory may be a single memory device or a plurality of memory devices. The memory may be a read-only memory, random access memory, volatile memory, non-volatile memory, static memory, dynamic memory, flash memory, cache memory, and/or any non-transitory memory device that stores digital information.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, frequencies, wavelengths, component values, integrated circuit process variations, temperature variations, rise and fall times, and/or thermal noise. Such relativity between items ranges from a difference of a few percent to magnitude differences.

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects of the embodiments have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

The invention claimed is:

1. A method of communication with a robotic detector configured for inline inspection of a pipeline, comprising:
    transmitting by the robotic detector a magnetic field signal through the pipeline;
    detecting the magnetic field signal by a companion device external to the pipeline;
    determining location information in response to detecting the magnetic field signal by the companion device, wherein the location information includes geo-data of a physical location of the robotic detector in the pipeline;
    generating by the companion device a message to a gateway, wherein the gateway is coupled to the pipeline and wherein the message includes the location information; and
    generating by the gateway a very-low or ultra-low frequency modulated signal in the pipeline, wherein the very-low or ultra-low frequency modulated signal includes the location information of the robotic detector.

2. The method of claim 1, further comprising:
    receiving the location information by the gateway;
    generating the very-low or ultra-low frequency modulated signal including the location information, wherein the very-low or ultra-low frequency modulated signal is a 300 HZ to 3000 Hz frequency signal; and
    transmitting the very-low or ultra-low frequency modulated signal through the pipeline.

3. The method of claim 2, further comprising:
    detecting the very-low or ultra-low frequency modulated signals by the robotic device using an antenna configured to interact with the pipeline; and
    processing by the robotic detector the location information and a communication time delay to determine a position of the robotic detector.

4. The method of claim 3, further comprising:
    associating by the robotic detector the position with measurements from one or more sensors.

5. The method of claim 1, wherein the companion device is included in an unmanned vehicle configured to track the robotic detector in the pipeline.

6. A system for inline inspection of a pipeline, comprising:
    a robotic detector configured for traveling in a pipeline, wherein the robotic detector includes a magnetic device that transmits a magnetic field signal in the pipeline; and
    a companion device external to the pipeline, wherein the companion device is configured to:
        detect the magnetic field signal generated by the robotic detector in the pipeline;
        determine location information in response to detecting the magnetic field signal; and
        continuously travel externally to the pipeline to follow the robotic detector in the pipeline using the magnetic field signal, wherein the companion device is further configured to transmit a message that includes the location information;
    a gateway device configured to receive the location information and generate a very-low or ultra-low frequency modulated signal through the pipeline, wherein the very-low or ultra-low frequency modulated signal includes the location information.

7. The system of claim 6, wherein the robotic detector further comprises an antenna configured to interact with the pipeline, wherein the robotic detector is configured to detect the very-low or ultra-low frequency modulated signal using the antenna.

8. The system of claim 7, wherein the robotic detector is further configured to process the location information to determine a position of the robotic detector in the pipeline.

9. The system of claim 8, wherein the robotic detector is further configured to associate the position of the robotic detector in the pipeline with one or more measurements from one or more sensors.

10. The system of claim 7, wherein the robotic detector is further configured to determine a communication time delay for receiving the location information and determine a position of the robotic detector in the pipeline using the location information and the communication time delay.

11. The system of claim 6, wherein the companion device includes an unmanned vehicle configured to track the robotic detector in the pipeline.

12. The system of claim 6, wherein the robotic detector includes a plurality of sensors configured to detect one or more of: pressure, temperature, flows, and acoustics in the pipeline.

13. A system for inline inspection of a pipeline, comprising:
- a robotic detector in a pipeline, wherein the robotic detector is configured to:
  - detect one or more measurements in the pipeline; and
  - generate a magnetic field signal in the pipeline;
- a companion device external to the pipeline configured to:
  - detect the magnetic field signal generated by the robotic detector in the pipeline;
  - track the robotic detector in the pipeline using the magnetic field signal;
  - travel externally to the pipeline to track and follow the robotic detector in the pipeline using the magnetic field signal;
  - determine geo-data in response to the magnetic field signal; and
  - generate a message that includes the geo-data;
- a gateway coupled to the pipeline, wherein the gateway is configured to:
  - receive the geo-data from the companion device, wherein the geo-data describes a physical location of the robotic detector in the pipeline; and
  - generate a very-low or ultra-low frequency modulated signal through the pipeline, wherein the very-low or ultra-low frequency modulated signal includes the geo-data.

14. The system of claim 13, wherein the robotic detector is further configured to detect the very-low or ultra-low frequency modulated signal to determine the geo-data.

15. The system of claim 14, wherein the robotic detector is further configured to:
- determine a communication time delay for receiving the geo-data; and
- determine a position of the robotic detector in the pipeline using the geo-data and the communication time delay.

16. The system of claim 15, wherein the robotic detector is further configured to associate the position of the robotic detector in the pipeline with the one or more measurements detected in the pipeline.

* * * * *